United States Patent
Mann et al.

(10) Patent No.: US 12,450,636 B1
(45) Date of Patent: Oct. 21, 2025

(54) COMPLAINT CLASSIFICATION IN CUSTOMER COMMUNICATIONS USING MACHINE LEARNING MODELS

(71) Applicant: Wells Fargo Bank, N.A., San Francisco, CA (US)

(72) Inventors: Thomas Mann, Charlotte, NC (US); Michael W. Soistman, Charlotte, NC (US); Nathan R Parrish, Chaska, MN (US); Noel P. Volin, Hudson, WI (US); Raja Ranganathan, Cary, NC (US); Dane Arnesen, Saint Louis Park, MN (US); Shawn Patrick Bocketti, Matthews, NC (US); Kevin Portis, San Pedro, CA (US); Josh Engebretson, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 84 days.

(21) Appl. No.: 18/067,261

(22) Filed: Dec. 16, 2022

Related U.S. Application Data (63) Continuation of application No. 16/781,620, filed on Feb. 4, 2020, now Pat. No. 11,790,411.
(Continued)

(51) Int. Cl.
*G06N 20/00* (2019.01)
*G06F 40/284* (2020.01)
(Continued)

(52) U.S. Cl.
CPC ....... *G06Q 30/0281* (2013.01); *G06F 40/284* (2020.01); *G06N 20/00* (2019.01);
(Continued)

(58) Field of Classification Search
CPC ................. G10L 15/22; H04M 3/51
See application file for complete search history.

(56) References Cited

U.S. PATENT DOCUMENTS

| | | | |
|---|---|---|---|
| 5,566,291 A | 10/1996 | Boulton et al. | |
| 7,272,222 B2 * | 9/2007 | Joseph | G06Q 10/109 |
| | | | 379/93.12 |

(Continued)

FOREIGN PATENT DOCUMENTS

| | | |
|---|---|---|
| CN | 108959431 A | 12/2018 |
| KR | 102107911 B1 | 5/2020 |
| WO | 2004017550 A2 | 2/2004 |

OTHER PUBLICATIONS

Mozetič, Igor, Miha Grčar, and Jasmina Smailović. "Multilingual Twitter sentiment classification: The role of human annotators." PloS one 11.5 (2016). (Year: 2016).*

(Continued)

*Primary Examiner* — Jialong He
(74) *Attorney, Agent, or Firm* — Shumaker & Sieffert, P.A.

(57) ABSTRACT

An example computing system for classifying messages is described. For example, a computing system includes a memory and one or more processors in communication with the memory. The one or more processors are configured to receive data indicative of a message from a user device, wherein the data indicative of the message comprises a string of characters, identify, based on the string of characters, a set of token vectors from a plurality of token vectors generated based on a set of training data, and determine, using a machine learning model and based on the set of token vectors, a probability that a risk level associated with the message is a first risk level indicating that the message is to be elevated, wherein the first risk level is greater than a second risk level.

18 Claims, 5 Drawing Sheets

Related U.S. Application Data (60) Provisional application No. 62/941,950, filed on Nov. 29, 2019.

(51) Int. Cl.
   *G06Q 30/01*    (2023.01)
   *G06Q 30/016*   (2023.01)
   *G06Q 30/02*    (2023.01)
   *G10L 15/22*    (2006.01)
   *G10L 15/26*    (2006.01)

(52) U.S. Cl.
   CPC ........... *G06Q 30/01* (2013.01); *G06Q 30/016* (2013.01); *G10L 15/26* (2013.01)

(56) References Cited

U.S. PATENT DOCUMENTS

| | | | |
|---|---|---|---|
| 7,487,094 B1* | 2/2009 | Konig | G10L 15/19 379/88.04 |
| 7,577,246 B2 | 8/2009 | Idan et al. | |
| 8,082,277 B1 | 12/2011 | O'Brien et al. | |
| 9,118,763 B1 | 8/2015 | Margulies et al. | |
| 9,413,891 B2 | 8/2016 | Dwyer | |
| 10,224,037 B2 | 3/2019 | Klein et al. | |
| 10,277,628 B1 | 4/2019 | Jakobsson | |
| 10,360,257 B2 | 7/2019 | Hou et al. | |
| 10,510,449 B1 | 12/2019 | Reicher et al. | |
| 10,529,030 B2 | 1/2020 | Kataria et al. | |
| 10,769,766 B1 | 9/2020 | Padfield et al. | |
| 11,120,200 B1 | 9/2021 | Totale et al. | |
| 11,218,386 B2 | 1/2022 | Kumar et al. | |
| 2006/0233347 A1* | 10/2006 | Tong | G10L 15/26 379/265.06 |
| 2007/0124278 A1 | 5/2007 | Lewis et al. | |
| 2008/0152122 A1 | 6/2008 | Idan et al. | |
| 2011/0270770 A1* | 11/2011 | Cunningham | G06Q 30/016 706/12 |
| 2012/0304304 A1 | 11/2012 | Avrahami et al. | |
| 2014/0140496 A1* | 5/2014 | Ripa | H04M 3/5175 379/265.06 |
| 2014/0270109 A1* | 9/2014 | Riahi | G06N 20/00 379/88.01 |
| 2014/0358518 A1 | 12/2014 | Wu et al. | |
| 2015/0242393 A1* | 8/2015 | Zaragoza | G06F 40/10 704/9 |
| 2016/0042359 A1 | 2/2016 | Singh | |
| 2016/0147731 A1 | 5/2016 | Parikh et al. | |
| 2016/0203566 A1 | 7/2016 | Kataria et al. | |
| 2017/0004543 A1 | 1/2017 | Bhamidipati et al. | |
| 2017/0359284 A1 | 12/2017 | Sudduth et al. | |
| 2018/0068222 A1 | 3/2018 | Brennan et al. | |
| 2018/0075368 A1 | 3/2018 | Brennan et al. | |
| 2018/0190291 A1 | 7/2018 | Lore et al. | |
| 2018/0225591 A1 | 8/2018 | Chandramouli et al. | |
| 2018/0300576 A1 | 10/2018 | Dalyac et al. | |
| 2019/0138595 A1 | 5/2019 | Galitsky | |
| 2019/0205667 A1 | 7/2019 | Avidan et al. | |
| 2019/0303726 A1 | 10/2019 | Cote et al. | |
| 2020/0019883 A1 | 1/2020 | McCourt, Jr. | |
| 2020/0067861 A1 | 2/2020 | Leddy et al. | |
| 2020/0294528 A1 | 9/2020 | Perri et al. | |
| 2020/0387570 A1 | 12/2020 | Biswas et al. | |
| 2021/0158235 A1* | 5/2021 | Sivasubramanian | H04M 3/5191 |
| 2021/0158366 A1 | 5/2021 | Arnold et al. | |
| 2021/0216822 A1 | 7/2021 | Paik et al. | |
| 2021/0326719 A1 | 10/2021 | Mahmud et al. | |

OTHER PUBLICATIONS

Keijsers, Merel, Christoph Bartneck, and Hussain Syed Kazmi. "Cloud-based sentiment analysis for interactive agents." Proceedings of the 7th international conference on human-agent interaction. Oct. 2019. (Year: 2019).*

Office Action from U.S. Appl. No. 17/099,666 dated Apr. 25, 2024, 15 pp.

Bontcheva et al., "GATE Teamware: a web-based, collaborative text annotation framework", Language Resources and Evaluation, Feb. 2, 2013, pp. 1007-1029.

Chen, Min, et al., "Label-less Learning for Emotion Cognition," IEEE Transactions on Neural Networks and Learning Systems, Jun. 29, 2020, 11 pp.

Clarabridge, "Intelligently Listen to and Analyse Multi-Channel Customer Feedback Data in Real-Time," Data Sheet, accessed from http://www.clarabridge.com/wp-content/uploads/2014/02/analyze61_ds_EMEA_2014.pdf, uploaded Feb. 2014, retrieved on Dec. 2019, 2 pages.

Hendrycks, Dan, et al., "Using Trusted Data to Train Deep Networks on Labels Corrupted by Severe Noise," Advances in neural information processing systems, Dec. 3-8, 2018, 10 pp.

Oyebode et al., "Using Machine Learning and Thematic Analysis Methods to Evaluate Mental Health Apps Based on Use Reviews", IEEE, Jun. 12, 2020, 18 pp.

Prosecution History from U.S. Appl. No. 16/781,620, dated Aug. 5, 2022 through Nov. 10, 2022, 32 pp.

Stanley, Robert, "NLP, AI & Speech Analytics in the Contact Center," retrieved from (https://callminer.com/blog/nlp-ai-speech-analytics-in-thecontact-center/, Mar. 7, 2017, 10 pp.

Tong et al., "A Complaint Text Classification Model Based on Character-Level Convolutional Network", 2018 IEEE 9th International Conference on Software Engineering and Service Science (ICSESS), IEEE, Nov. 2018, pp. 507-511.

U.S. Appl. No. 16/781,620, filed Feb. 4, 2020, by Mann et al.

U.S. Appl. No. 17/099,666, filed Nov. 16, 2020, by Mann et al.

U.S. Appl. No. 17/112,685, filed Dec. 4, 2020, naming inventors Ritchie et al.

Response to Final Office Action dated Nov. 10, 2022 from U.S. Appl. No. 16/781,620, filed Feb. 9, 2023, 3 pp.

Notice of Allowance from U.S. Appl. No. 16/781,620 dated Feb. 22, 2023, 7 pp.

Response to Office Action dated Apr. 25, 2024 from U.S. Appl. No. 17/099,666, filed Jul. 25, 2024, 13 pp.

Final Office Action from U.S. Appl. No. 17/099,666 dated Nov. 18, 2024, 14 pp.

* cited by examiner

COMPLAINT CLASSIFICATION IN CUSTOMER COMMUNICATIONS USING MACHINE LEARNING MODELS

This application is a continuation of U.S. patent application Ser. No. 16/781,620, filed on Feb. 4, 2020, which claims the benefit of U.S. Provisional Application No. 62/941,950, filed Nov. 29, 2019. The entire content of each of these applications is incorporated herein by reference.

TECHNICAL FIELD

The disclosure relates to computing systems, and more specifically, computing systems executing machine learning models configured to detect patterns.

BACKGROUND

A customer service center is a facility configured to handle incoming messages from customers or potential customers of a business or organization. One function of the customer service center is to handle customer service inquiries, such as complaints, focused on one or more services provided by the business, e.g., customer accounts and loans. Although many customer service inquiries can be handled through online interactions (e.g., via websites, email, or mobile applications), for some businesses, a customer service center may be regarded as necessary. A customer service center may include one or more message analysis systems and one or more agent desktop systems used by a number of human agents that are representatives of the business.

SUMMARY

In general, this disclosure describes techniques for performing complaint identification and classification using a machine learning model for customer communications associated with a business or organization. More specifically, a computing system may receive one or more messages including customer service inquiries, such as customer complaints. The computing system uses a machine learning model to convert a message into a sequence of tokens (e.g., numerical values representing words), and determines a set of token vectors including a token vector corresponding to each token of the sequence of tokens. Such mapping of words to vectors may represent a technique known as "word embedding." The computing system then calculates a probability that the message is associated with a first risk level indicating that the message is to be elevated by the customer service center based on the set of token vectors. For example, the first risk level may indicate that the message is flagged for addressing by a customer service representative or agent, or a customer service manager. The first risk level is greater than a second risk level. Additionally, or alternatively, the computing system may use a machine learning model to identify a complaint type and/or a complaint reason.

The techniques of this disclosure may provide one or more advantages. For example, by using the machine learning model to identify one or more messages corresponding to the first risk level, the computing system may identify a greater percentage of messages corresponding to the first risk level than computing systems that do not identify one or more messages corresponding to the first risk level using a machine learning model. Moreover, the computing system may identify a greater percentage of messages corresponding to the first risk level and a greater volume of messages corresponding to the first risk level than human agents who do not use machine learning models to classify messages. Since the first risk level is greater than the second risk level, messages corresponding to the first risk level may be referred to herein as "high-risk" messages and messages corresponding to the second risk level may be referred to herein as "low-risk" messages. It may be beneficial for the computing system to identify high-risk messages using the machine learning model in order to increase a probability that a given high-risk message is addressed as compared with computing systems which do not use a machine learning model to identify high-risk messages.

Additionally, or alternatively, it may be beneficial for the computing system to use word embedding, a technique in which one or more words are mapped to vectors, as a part of the machine learning model for analyzing messages for risk level. Word embedding provides an effective way to characterize a message based on a relationship between one or more groups of words in the message. For example, by using word embedding, the computing device may increase a probability of identifying high-risk messages as compared with computing systems that do not use word embedding to identify high-risk messages.

In some examples, a computing system includes a memory and one or more processors in communication with the memory. The one or more processors are configured to receive data indicative of a message from a user device, wherein the data indicative of the message comprises a string of characters, identify, based on the string of characters, a set of token vectors from a plurality of token vectors generated based on a set of training data, and determine, using a machine learning model and based on the set of token vectors, a probability that a risk level associated with the message is a first risk level indicating that the message is to be elevated, wherein the first risk level is greater than a second risk level.

In some examples, a method includes receiving, by one or more processors of a computing system, data indicative of a message from a user device, wherein the data indicative of the message comprises a string of characters, identifying, based on the string of characters, a set of token vectors from a plurality of token vectors generated based on a set of training data, and determining, using a machine learning model and based on the set of token vectors, a probability that a risk level associated with the message is a first risk level indicating that the message is to be elevated, wherein the first risk level is greater than a second risk level.

In some examples, a computer readable medium includes instructions that when executed cause one or more processors to receive data indicative of a message from a user device, wherein the data indicative of the message comprises a string of characters, identify, based on the string of characters, a set of token vectors from a plurality of token vectors generated based on a set of training data, and determine, using a machine learning model and based on the set of token vectors, a probability that a risk level associated with the message is a first risk level indicating that the message is to be elevated, wherein the first risk level is greater than a second risk level.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
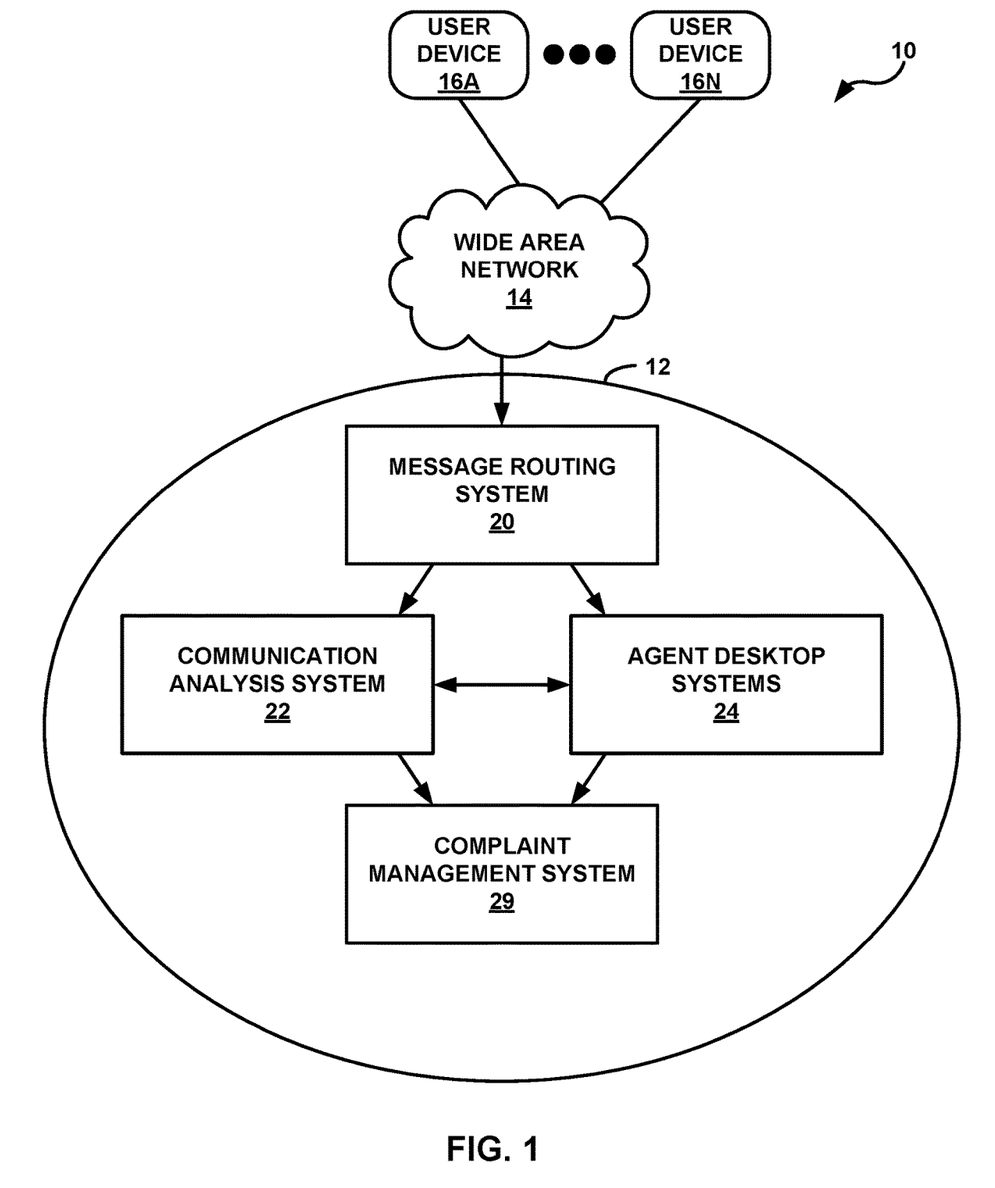
FIG. 1 is a block diagram illustrating an example message center within a network that includes a communication analysis system configured to classify an incoming message, in accordance with one or more techniques of this disclosure.

FIG. 1 is a block diagram illustrating an example message center 12 within a network 10 that includes communication analysis system 22 configured to classify an incoming message, in accordance with one or more techniques of this disclosure. As illustrated in FIG. 1, network 10 includes one or more user devices 16A-16N (collectively "user devices 16") in communication with message center 12 via a network 14.

Message center 12 is a facility configured to handle incoming messages from user devices 16 operated by users that may be customers or potential customers of a business or organization. Message center 12 includes several disparate computing systems configured to handle customer service inquiries focused on customer accounts with the business or other services provided by the business, e.g., servicing existing accounts, opening new accounts, servicing existing loans, and opening new loans. In some examples described in this disclosure, message center 12 may be a customer service center of a bank or other financial institution. Message center 12 may allow customers to speak to a live person when resolving service issues and/or leave a voice message detailing one or more service issues. Additionally, or alternatively, message center 12 may allow customers to submit messages (e.g., service complaints) via text channels such as email, text messaging, and social media messaging.

User devices 16 may be any suitable communication or computing device, such as a conventional or landline phone, or a mobile, non-mobile, wearable, and/or non-wearable computing device capable of communicating over network 14. For example, each user device of user devices 16 may include any one or combination of a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, and non-mobile computing device that may perform operations in accordance with one or more aspects of the present disclosure. One or more of user devices 16 may support communication services over packet-switched networks, e.g., the public Internet, including Voice over Internet Protocol (VOIP). One or more of user devices 16 may also support communication services over circuit-switched networks, e.g., the public switched telephone network (PSTN).

Each of user devices 16 is operated by a user that may be a customer or a potential customer of the business or organization that provides message center 12. In the case of a business or corporate customer, the user may be a representative of the business or a corporate customer. In some examples, the user may be a customer who wishes to convey a complaint and/or a concern about one or more services provided by the business or organization that provides message center 12 or another aspect relating to the business or organization. In one or more cases where the user conveys a complaint or a concern, the complaint or concern may include a level of severity, or urgency. For example, message center 12 may receive a message from a user device of user device 16, where the message is representative of a user complaint. In some examples, the message may be associated with a first risk level or a second risk level, where the first risk level is greater than the second risk level. For example, messages of the first risk level may include a greater level of severity or urgency than messages of the second risk level. It may be beneficial to automatically identify, using a machine learning model, an incoming message from a user device of user devices 16 as being associated with the first risk level or the second risk level in order to prevent an occurrence in which a message of the first risk level is ignored or overlooked. Additionally, or alternatively, the message may be associated with one or more complaint types of a set of complaint types and/or one or more complaint reasons of a set of complaint reasons.

Network 14 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, network 14 may include a combination of multiple networks.

Message center 12 may include a centralized or distributed network of the disparate computing systems made up of interconnected desktop computers, laptops, workstations, wireless devices, network-ready appliances, file servers, print servers, or other computing devices. For example, message center 12 may include one or more data centers including a plurality of servers configured to provide account services interconnected with a plurality of databases and other storage facilities in which customer credentials, customer profiles, and customer accounts are stored.

In the example of FIG. 1, message center 12 includes systems in which a user may interact, including one or more one or more agent desktop systems 24 used by a number of human agents that are representatives of the business or organization. These systems may be third-party vendor products used by the business or organization to interact with its customers. Message center 12 also includes message routing system 20 and communication analysis system 22. In this example, message routing system 20 and communication analysis system 22 may be propriety tools of the business or organization to facilitate the functions of message center 12, including collecting, storing, and maintaining data used by message center 12. The architecture of message center 12 illustrated in FIG. 1 is shown for exemplary purposes only and should not be limited to this architecture. In other examples, message center 12 may include more, fewer, or different computing systems configured to handle messages representing customer service inquiries.

In some examples, message routing system 20 of message center 12 receives an inbound message from network 14 and determines whether to route the inbound message to one or both of communication analysis system 22 and agent desktop systems 24. In accordance with one or more techniques of this disclosure where the message is routed to communication analysis system 22, communication analysis system 22 monitors the inbound message in order to determine a risk level of the message. Additionally, or alternatively, message routing system 20 may route messages to one or more devices, users, or systems other than communication analysis system 22 and agent desktop systems 24. In an example where the incoming message represents a voice message including voice data, a voice-to-text engine (not illustrated in FIG. 1) is configured to convert the voice data to text data, where the text data is indicative of one or more words, phrases, exclamations, and other sounds conveyed in the voice message.

In one or more examples, message routing system 20 may route an incoming message to one or both of communication analysis system 22 and agent desktop systems 24. In some examples, one of agent desktop systems 24 may receive user input from a human agent, where the user input indicates whether a message routed to the one of agent desktop systems 24 is determined to be a high-risk message or a low-risk message. In some examples, if the user input to the one of agent desktop systems 24 indicates that the message is a low-risk message, the one of agent desktop systems 24 may save the message to a communication database (not illustrated in FIG. 1). Communication analysis system 22 may evaluate the message to determine, or verify, whether the message is indeed a low-risk message. If the user input to the one of agent desktop systems 24 indicates that the message is a high-risk message, the one of agent desktop systems 24 may send the message to complaint management system 29 in order to "elevate" the message within message center 12 such that the message is addressed and/or resolved. Communication analysis system 22 may evaluate the message to determine, or verify, whether the message is indeed a high-risk message.

Communication analysis system 22 may check an accuracy of the data output from agent desktop systems 24 in identifying high risk and low risk messages. In some examples, communication analysis system 22 may save data indicative of the accuracy of the data output by agent desktop systems 24 in identifying high risk and low risk messages. The data indicative of the accuracy of the data output by agent desktop systems 24 may indicate whether each message analyzed by agent desktop systems 24 is correctly identified in data output by agent desktop systems 24. To identify whether a message that is classified by agent desktop systems 24 is correctly identified, communication analysis system 22 may use a machine learning model to determine whether the message is high-risk or low-risk. Subsequently, communication analysis system 22 may determine whether a classification of the message (e.g., high-risk or low-risk) as indicated by the data output by agent desktop systems 24 is the same as a classification of the message as determined by communication analysis system 22. If the classification is the same, communication analysis system 22 may determine that the classification of the message in the data output by agent desktop systems 24 is correct. If the classification is the different, communication analysis system 22 may determine that the classification of the message in the data output by agent desktop systems 24 is not correct.

If communication analysis system 22 and/or agent desktop systems 24 indicate that a message is a high-risk message, communication analysis system 22 and/or agent desktop systems 24 may send the message to complaint management system 29 in order to elevate the message within message center 12 such that the message is addressed. In one or more examples where both of communication analysis system 22 and agent desktop systems 24 identify a message as being a low-risk message, one or both of communication analysis system 22 and agent desktop systems 24 may categorize the low-risk message and store the low-risk message to a communication database. In some examples, to categorize a message, communication analysis system 22 may classify the message as being high-risk or low-risk, classify a complaint type associated with the message, classify a complaint reason associated with the message, or any combination thereof.

Elevating a high-risk message may include flagging the high-risk message as including a rather urgent, grave, or serious complaint or criticism of one or more services or aspects of the business or organization that provides message center 12. Such flagging of a high-risk message may cause complaint management system 29 to prioritize an addressing of the high-risk message so that a probability that the high-risk message is resolved is greater than a probability that high-risk messages are resolved by systems that do not flag high-risk messages.

Communication analysis system 22 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, communication analysis system 22 represents cloud computing systems, server farms, and/or server clusters (or portions thereof) that provide services to client devices and other devices or systems. In other examples, communication analysis system 22 may represent or be implemented through one or more virtualized compute instances (e.g., virtual machines, containers) of a data center, cloud computing system, server farm, and/or server cluster. Communication analysis system 22 may communicate with external systems via one or more networks (e.g., message center 12). In some examples, communication analysis system 22 may use network interfaces (such as Ethernet interfaces, optical transceivers, radio frequency (RF) transceivers, Wi-Fi or Bluetooth radios, or the like), telephony interfaces, or any other type of device that can send and receive information to wirelessly communicate with external systems, e.g., message routing system 20, agent desktop systems 24, and complaint management system 29.

In some examples, one or more processors may execute communication analysis system 22 to determine a risk level of an incoming message to message center 12. For example, communication analysis system 22 may receive data indicative of a message delivered to a message center 12 from a user device of user devices 16 (e.g., user device 16A). In some examples, the data indicative of the message comprises a string of characters. The string of characters may include, for example, a string of characters generated by user device 16A as a part of a text-based message such as a text message, an email, or a social media message. In some examples, the message represents a voice message and the string of characters are generated by a voice-to-text engine configured to convert an audio message into text data. In any case, the string of characters included in data indicative of the message may include one or more words, phrases, characters, or any combination thereof.

In some examples, communication analysis system 22 may determine, based on the string of characters included in the data indicative of the message received by message center 12, a sequence of tokens corresponding to the message. For example, communication analysis system 22 may identify a set of words in the string of characters and look up a respective token corresponding to each word of the set of words in a token dictionary stored in a memory. The token dictionary may include a plurality of words and a plurality tokens, where the token dictionary connects each word of the plurality of words to a respective token to the plurality of tokens. As such, communication analysis system 22 may generate the sequence of tokens using the token dictionary in order to match an order of the set of words in the data indicative of the message received by customer center 12. A token includes a numerical value. In this way, communication analysis system 22 may receive data indicative of the message received by message center 12, which includes a string of characters such as letters, numbers, punctuation, special characters, or any combination thereof and convert the data into numerical data for further processing.

Communication analysis system 22 may be configured to identify a set of token vectors including a token vector corresponding to each token of the sequence of tokens generated from the data indicative of the message received by message center 12. A token vector database may include a plurality of tokens and a plurality of token vectors, wherein each token of the plurality of tokens is connected to a respective token vector of the plurality of token vectors. Communication analysis system 22 may identify the set of token vectors using the token vector database, by looking up the respective token vector connected to each token of the sequence of tokens. While a token may include a single numerical value, a token vector may include more than one numerical value, in some examples. As such, a token vector may indicate a direction within a space such as a two-dimensional space, a three-dimensional space, or an nth dimensional space. As such, one or more token vectors may fit within a space, which may be referred to herein as a "token vector space." A relationship between a pair of token vectors, for example, may be determined. For example, the two or more token vectors may be added, subtracted, multiplied, or divided and a new vector may be generated by such an operation. Relationships between two or more token vectors the set of token vectors corresponding to the message received by message center 12 may indicate one or more characteristics of the message, such as whether the message is high-risk or low-risk, a type of complaint that the message represents, or a reason for the complaint that the message represents.

The token vector database which connects token vectors to tokens, in some cases, may be generated using one or more machine learning algorithms. In some examples, the one or more machine learning algorithms may include one or more "word embedding" algorithms. Word embedding may include one or more techniques of mapping words or phrases from English or another language to vectors including real numbers (e.g., numerical values). Such word embedding machine learning algorithms, in some cases, may be "trained" using a set of training data. For example, the training data may include a volume of text which includes any one or more of full sentences, partial sentences, single words, short phrases, paragraphs. The word embedding machine learning algorithms may generate a token vector database which connects tokens to token vectors, where tokens are numerical representations of words. Tokens include single numerical values and token vectors may include more than one numerical value. As such, a token vector may represent a multi-dimensional concept, and a token vector space may include more than one token vector and indicate a relationship between token vectors.

In some examples, communication analysis system 22 may generate a token vector space using the set of token vectors corresponding to the message received by message center 12 from user device 16A. In turn, communication analysis system 22 may determine, based on the token vector space, a probability that a risk level associated with the message is a first risk level. A message that is determined to be associated with the first risk level may be elevated by message center 12. Elevating messages associated with the first risk level may decrease a probability that messages associated with the first risk level are ignored, overlooked, or otherwise not addressed as compared with systems that do not elevate messages associated with the first risk level. In some examples, the first risk level is greater than the second risk level. In some examples, messages that are determined to be associated with the second risk level might not be flagged for elevation within message center 12, and messages that are determined to be associated with the second risk level are addressed by message center 12 according to a protocol for handling such messages. In some examples, messages associated with the first risk level may be referred to as high-risk messages and messages associated with the second risk level are referred to as low-risk messages.

In some examples, to generate the token vector space corresponding to a message received by message center 12, communication analysis system 22 may calculate a sum of the set of token vectors determined based on the words in the message. Subsequently, communication analysis system 22 may determine a probability that the message is associated with the first risk level based on the sum of the set of token vectors. In some examples, communication analysis system 22 may determine that the message is a high-risk message if the probability is greater than a threshold probability.

Figure 2:
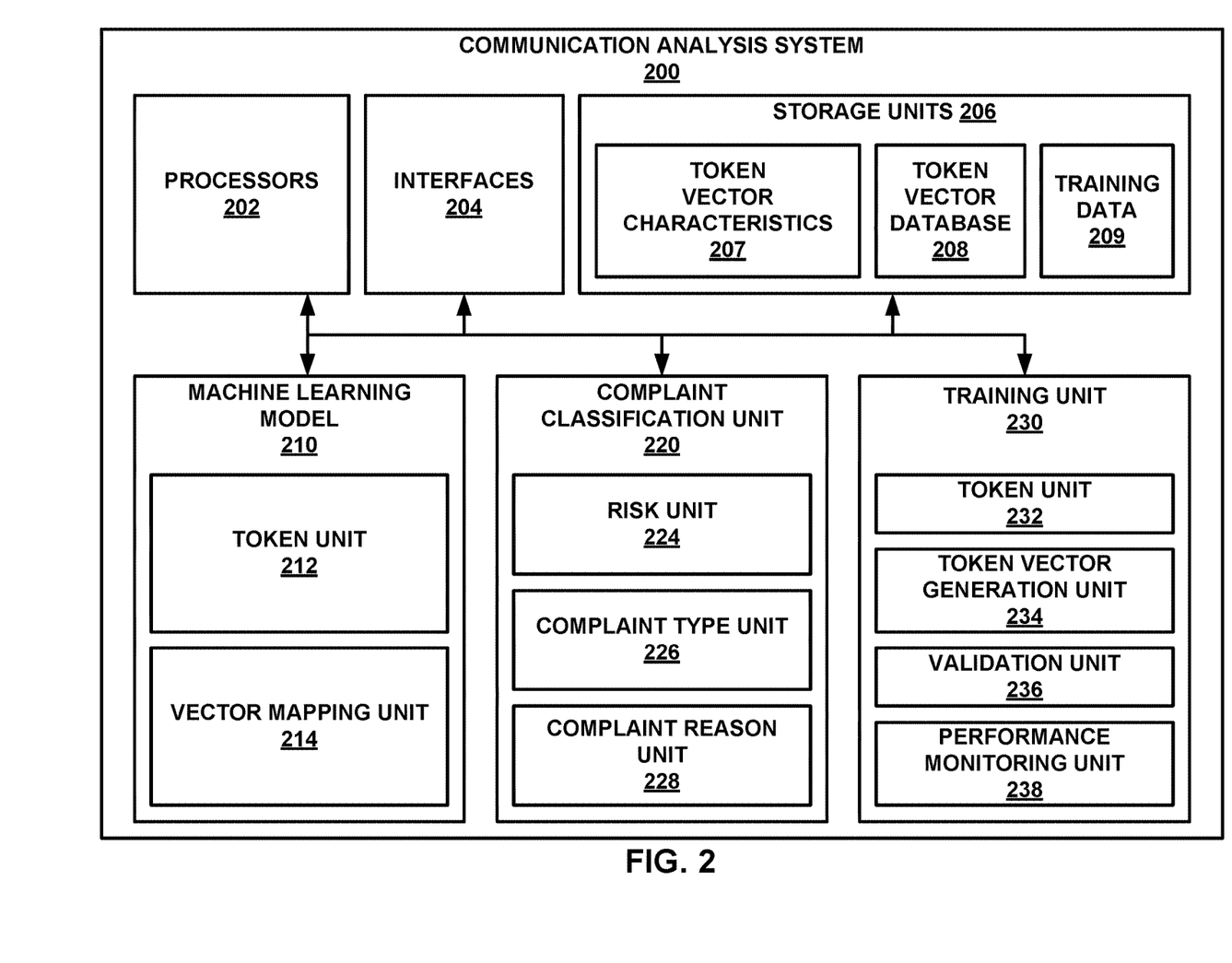
FIG. 2 is a block diagram illustrating an example communication analysis system, in accordance with one or more techniques of this disclosure.

FIG. 2 is a block diagram illustrating an example communication analysis system 200, in accordance with one or more techniques of this disclosure. Communication analysis system 200 of FIG. 2 may be described as an example or alternative implementation communication analysis system 22 within message center 12 of FIG. 1. One or more aspects of communication analysis system 200 of FIG. 2 may be described within the context of message center 12 of FIG. 1. The architecture of communication analysis system 200 illustrated in FIG. 2 is shown for exemplary purposes only. Communication analysis system 200 should not be limited to the illustrated example architecture. In other examples, communication analysis system 200 may be configured in a variety of ways.

Communication analysis system 200 includes a machine learning model 210 configured to map data indicative of an incoming message to message center 12 to one or more token vectors of a plurality of token vectors. For example, communication analysis system 200 may parse the data indicative of the incoming message to identify a sequence of items including any one or combination of words, phrases, characters (e.g., punctuation), and numerical values. To map the data indicative of the message to the set of token vectors, machine learning model 210 may identify a token vector corresponding to each item of the sequence of items in order to identify a set of token vectors. Using the set of token vectors, a complaint classification unit 220 of communication analysis system 200 may classify the message. Classification may include any one or combination of classifying the message as being high-risk or low risk, identifying a type of complaint corresponding to the message from a set of complaint types, and identifying a complaint reason corresponding to the message from a set of complaint reasons.

Complaint analysis system 200 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, complaint analysis system 200 represents a cloud computing system, server farm, and/or server cluster (or portion thereof) that provides services to client devices and other devices or systems. In other examples, complaint analysis system 200 may represent or be implemented through one or more virtualized compute instances (e.g., virtual machines, containers) of a data center, cloud computing system, server farm, and/or server cluster.

As shown in the example of FIG. 2, communication analysis system 200 includes one or more processors 202, one or more interfaces 204, and one or more storage units 206. Communication analysis system 200 also includes a machine learning model 210, a complaint classification unit 220, and a training unit 230, which may be implemented as program instructions and/or data stored in storage units 206 and executable by processors 202. Storage units 206 of communication analysis system 200 may also store an operating system (not illustrated in FIG. 2) executable by processors 202 to control the operation of components of communication analysis system 200. The components, units or modules of communication analysis system 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within message center 12. For example, processors 202 may be capable of processing instructions stored by storage units 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Communication analysis system 200 may utilize interfaces 204 to communicate with external systems via one or more networks, e.g., message center 12 of FIG. 1. Interfaces 204 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, communication analysis system 200 utilizes interfaces 204 to wirelessly communicate with external systems, e.g., message routing system 20, agent desktop systems 24, and complaint management system 29 of message center 12 from FIG. 1.

Storage units 206 may be configured to store information within communication analysis system 200 during operation. Storage units 206 may include a computer-readable storage medium or computer-readable storage device. In some examples, storage units 206 include one or more of a short-term memory or a long-term memory. Storage units 206 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 206 are used to store program instructions for execution by processors 202. Storage units 206 may be used by software or applications running on communication analysis system 200 to temporarily store information during program execution.

Communication analysis system 200 includes a machine learning model 210, a complaint classification unit 220, and a training unit 230. As seen in FIG. 2, machine learning model 210 includes token unit 212 and vector mapping unit 214, complaint classification unit 220 includes risk unit 224, complaint type unit 226, and complaint reason unit 228, and training unit 230 includes token unit 232, token vector generation unit 234, and performance monitoring unit 238.

Machine learning model 210 may include a function configured to be executed by processors 202. In some examples, machine learning model 210 implements supervised learning, e.g., classifies sets of data into groups. For example, a set of data, such as data indicative of a message into message center 12, may be classified as being high-risk or as being low-risk. Additionally, or alternatively, data indicative of a message into message center 12 may be classified based on complaint type and complaint reason. In some examples, the function may include nodes, layers, and connections, and the function may be represented by equations having a plurality of variables and a plurality of known coefficients.

Machine learning algorithms, such as the function of machine learning model 210, may be trained using a training process to create data-specific models, such as machine learning model 210 based on training data 209. After the training process, the created model may be capable of determining an output data set based on an input data set (e.g., match a set of token vectors representing an incoming message to one or more known characteristics associated with high-risk messages, match a set of token vectors representing an incoming message to one or more known characteristics associated with each complaint type of a set of complaint types, and/or match a set of token vectors representing an incoming message to one or more known characteristics associated with each complaint reason of a set of complaint reasons). The training process may implement a set of training data (e.g., training data 209) to create the model.

Training data 209 may include data indicative of a plurality of messages. At least some of the plurality of messages may represent customer complaints submitted to message center 209. The plurality of messages may include a group of high-risk messages and a group of low-risk messages, where each message of the plurality of messages is either known to be high-risk or known to be low-risk. In one example, training data 209 contains data representing about equal numbers of high-risk messages and low-risk messages. In another example, training data 209 contains data including a greater number of low-risk messages than high-risk messages. In another example, training data 209 contains data including a greater number of high-risk messages than low-risk messages. In some examples, the plurality of messages may include a group of messages corresponding to each complaint type of a set of complaint types. In some examples, the plurality of messages may include a group of messages corresponding to each complaint reason of a set of complaint reasons. Training unit 230 may access training data 209 stored in storage units 206, and training unit 230 may train machine learning model 210 using training data 209.

In some examples, token unit 232 may convert each message of the plurality of messages in training data 209 into a sequence of tokens. Each token of the sequence of tokens may represent a word, a phrase, or another set of characters (e.g., punctuation). As described herein, a "token" may include a single numerical value and a "token vector" may include a set of one or more numerical values. Token vector generation unit 234 may generate a token vector database 208 including a plurality of token vectors for storage by storage units 206, where each token vector of the plurality of token vectors corresponds to a token. In some examples, token vector generation unit 234 may generate the plurality of token vectors based on the group of high-risk messages and the group of low-risk messages in training data 209. In some examples, token vector generation unit 234 may generate the plurality of token vectors based on the group of messages in training data 209 corresponding to each complaint type of the set of complaint types. In some examples, token vector generation unit 234 may generate the plurality of token vectors based on the group of messages in training data 209 corresponding to each complaint reason of the set of complaint reasons.

During the training, token vector generation unit 234 may generate the plurality of token vectors to indicate one or more characteristics associated with the group of high-risk messages in training data 209 and one or more characteristics associated with the group of low-risk messages in training data 209. In other words, token vector generation unit 234 may identify the one or more characteristics associated with the group of high-risk messages in training data 209 and identify the one or more characteristics associated with the group of low-risk messages in training data 209. In this way, a message which is not known to be either high-risk or low-risk may be classified as high-risk or low-risk based on the token vector database 208, since each token vector of token vector database 208 may include characteristics associated with high-risk messages and/or characteristics associated with low-risk messages. In some examples, token vector generation unit 234 may generate the plurality of token vectors to indicate one or more characteristics associated with each complaint type of the set of complaint types. In some examples, token vector generation unit 234 may generate the plurality of token vectors to indicate one or more characteristics associated with each complaint reason of the set of complaint reason. The characteristics associated with high-risk messages, the characteristics associated with low-risk messages, the characteristics associated with each complaint type of the set of complaint types, and the characteristics associated with each complaint reason of the set of complaint reasons may be saved to storage units 206 as a part of token vector characteristics 207.

A machine learning algorithm or function (e.g., a word embedding algorithm) is trained to create machine learning model 210 configured to accept an input sequence of tokens associated with a message and produce, using complaint classification unit 220, any one or combination of an output classification of whether the incoming message is high-risk or low-risk, an output classification of a complaint type associated with the message, and an output classification of a complaint reason associated with the message. Classification unit 220 may generate classifications based on token vector characteristics 207. For example, classification unit 220 may classify an incoming message as high-risk if a set of token vectors associated with the incoming message have greater than a threshold level of similarity to known characteristics of high-risk messages, as identified by token vector characteristics 207. Training unit 230 may output token vector characteristics 207 and token vector database 208 to storage devices 206.

Validation unit 236 may be configured to determine an accuracy of machine learning model 210. For example, validation unit 236 may use machine learning model 210 to determine if an example incoming message corresponding to a sequence of tokens is high-risk or low-risk. A classification (e.g., high-risk or low-risk) of the example sequence of code pairs may be known. Validation unit 236 may determine if machine learning model 210 was able to correctly classify the incoming message. Additionally, validation unit 236 may be configured to determine the accuracy of machine learning model 210 for a plurality of example sequences tokens each corresponding to a message, and validation unit 236 may be configured to identify an accuracy (e.g., a success rate) in which machine learning model 210 correctly classifies the messages as being high-risk or low-risk. If the accuracy is above a threshold accuracy value, complaint classification unit 220 may use machine learning model 210 to classify incoming messages to message center 12. If the accuracy is below the threshold accuracy value, training unit 230 may re-train machine learning model 210 based on an updated set of training data. In some examples, the threshold accuracy value in which machine learning model 210 may be used may be greater than or equal to 90%. In some examples, validation unit 236 may be configured to identify an accuracy in which machine learning model 210 correctly classifies the complaint type of a plurality of messages. In some examples, validation unit 236 may be configured to identify an accuracy in which machine learning model 210 correctly classifies the complaint reason of a plurality of messages.

Training unit 230 may include performance monitoring unit 238. Performance monitoring unit 238 may monitor a performance of machine learning model 210 after it is applied to classify incoming messages to message center 12 (e.g., classify as being high-risk or low-risk, classify based on complaint type, and/or classify based on complaint reason). In some examples, performance monitoring unit 238 may determine an accuracy of machine learning model 210 by comparing risk classifications by machine learning model 210 with known risk classifications of a plurality of messages. For example, if machine learning model 210 determines that an incoming message is low-risk, and the incoming message is discovered to be high-risk, performance monitoring unit 238 may record that an incorrect risk classification was made. Performance monitoring unit 238 may continuously monitor an accuracy of machine learning model 210. Performance monitoring unit 238 may determine a fraction of messages in which machine learning model 210 correctly classifies an incoming message. The fraction may represent a measured accuracy of the model. New messages may be analyzed by performance monitoring unit 238, the new messages representing data that was not used by training unit 230 to create the model. In other words, performance monitoring unit 238 may test the accuracy of the model continuously using new data. In some examples, if performance monitoring unit 238 determines that the accuracy of machine learning model 210 is below a threshold accuracy value (e.g., 90%), performance monitoring unit 238 may output an instruction to re-train machine learning model 210.

Training unit 230 may periodically (e.g., monthly, bimonthly, yearly, or the like) re-train machine learning model 210 based on an updated set of training data. The updated set of training data may include part or all of the plurality of messages of training data 209. Additionally, the updated set of training data may include a set of messages that are received by message center 12 during a time since machine learning model 210 was last trained by training unit 230.

As seen in FIG. 2, machine learning model 210 includes token unit 212 and vector mapping unit 214. Token unit 212 is configured to convert data indicative of an incoming message to message center 12 into a sequence of tokens. For example, the data indicative of the message may include a sequence of characters includes one or more words. In general, the term "words" may include words of the English language or other languages, single numerals, groups of single numerals, numerical strings, groups of numerical strings, single characters, groups of single characters, character strings, or groups of character strings. Token unit 212 may determine, for each word of the sequence of words, a numerical token corresponding to the respective word. A token may represent a numerical value. For example, a token may represent a binary value including "0s" and "1s." In this way, token unit 212 may transform the data indicative of the message into a sequence of numerals, which may be beneficial for preparing the data as an input to machine learning model 210. In some examples, storage units 206 are configured to store a token dictionary which identifies a token corresponding to each word of a plurality of words. Token unit 212 may access the token dictionary in order to convert the data including the sequence of characters into a sequence of tokens.

Vector mapping unit 214 may be configured to determine, using token vector database 208 generated by training unit 230 based on training data 209, a token vector corresponding to each token of the sequence of tokens corresponding to the incoming message. Token vectors, unlike tokens which are single numerical values, may in some cases include a set of numerical values including more than one numerical value. In some cases, a token vector may include a single numerical value or a set of zero numerical values. In this way, a token vector may include information indicative of a direction and a magnitude within a multi-dimensional space, where the information indicative of the direction and the magnitude may represent information associated with one or more characteristics of groups within training data 209. For example, characteristics corresponding to high-risk messages, characteristics corresponding to low-risk messages, characteristics corresponding to each complaint type of a set of complaint types, characteristics corresponding to each complaint reason of a set of complaint reasons, or any combination thereof, may be present in an individual token vector or a set of token vectors corresponding to an incoming message. Complaint classification unit 220 may be configured to classify an incoming message based on a set of token vectors that are identified by vector mapping unit 214 using a set of words identified in the message.

Complaint classification unit 220 may be configured to classify a message using risk unit 224, complaint type unit 226, complaint reason unit 228, or any combination thereof. Risk unit 224 may be configured to identify a probability that an incoming message is a high-risk message based on the set of token vectors that are identified using the message data. For example, risk unit 224 may calculate a probability that an incoming message is high-risk based on one or more characteristics of a set of token vectors identified by vector mapping unit 214 using the data indicative of the incoming message. Risk unit 224 may calculate the probability based on a level of similarity between the identified characteristics in the set of token vectors corresponding to the incoming message and known characteristics of high-risk messages identified by token vector characteristics 207. In some examples, the probability that the incoming message is high-risk given by a value ranging from 0 to 1, a value of 0 representing a 0% chance that the incoming message is high-risk, and a value of 1 representing a 100% chance that the incoming message is high-risk.

Risk unit 224 may output notifications of a determined probability. For example, risk unit 224 may use interfaces 204 which may include network interfaces (e.g., Ethernet interfaces, optical transceivers, RF transceivers, Wi-Fi or Bluetooth radios, or the like), telephony interfaces, or any other type of device that can send and receive information to wirelessly communicate with external systems such as agent desktop systems 24 and complaint management system 29. In some examples, in response to determining that the probability that an incoming message is below a threshold value, risk unit 224 may determine that the incoming message is low-risk, and risk unit 224 may output an instruction to classify the incoming message as being low-risk and save the message to a low-risk message database. Alternatively, if risk unit 224 determines that the probability of an incoming message being high-risk is greater than or equal to the threshold value, risk unit 224 may output a determination that the incoming message is a high-risk message and forward the message to complaint management system 29 in order to elevate the message. In one example, the threshold value is within a range from 0.6 (60%) to 0.8 (80%). In other examples, the threshold value may be less than 0.6 or greater than 0.8.

In some examples, risk unit 224 outputs information indicating that an incoming message is classified as being high-risk to complaint management system 29. By indicating that the incoming message is classified as high-risk, risk unit 224 may elevate the message within message center 12 such that the message is addressed as an urgent, or an especially important message. In response to receiving the information indicating that the message is classified as being high-risk, complaint management system 29 may perform one or more actions relating to the message in order to address and/or resolve the message. For example, a user of complaint management system 29 may output a communication to a user device of user devices 16 that submitted the message to message center 12.

Complaint type unit 226 may be configured to identify a probability that an incoming message is associated with a particular complaint type of a set of complaint types based on the set of token vectors that are identified using the message data. For example, complaint type unit 226 may calculate a probability that an incoming message is associated with the particular complaint type based on one or more characteristics of a set of token vectors identified by vector mapping unit 214 using the data indicative of the incoming message. Complaint type unit 226 may calculate the probability based on a level of similarity between the identified characteristics in the set of token vectors corresponding to the incoming message and known characteristics of messages associated with the particular complaint type identified by token vector characteristics 207. In some examples, complaint type unit 226 may calculate a probability that the message is associated with each complaint type of the set of complaint types, and determine that the message is associated with the complaint type of the highest probability. In some examples, complaint type unit 226 may calculate a probability that the message is associated with each complaint type of the set of complaint types and determine that the message is associated with each complaint type of greater than a threshold probability. Complaint type unit 226 may output information indicative of the classification of the message as being associated with one or more complaint types of the set of complaint types.

Complaint reason unit 228 may be configured to identify a probability that an incoming message is associated with a particular complaint reason of a set of complaint reasons based on the set of token vectors that are identified using the message data. For example, complaint reason unit 228 may calculate a probability that an incoming message is associated with the particular complaint reason based on one or more characteristics of a set of token vectors identified by vector mapping unit 214 using the data indicative of the incoming message. Complaint reason unit 228 may calculate the probability based on a level of similarity between the identified characteristics in the set of token vectors corresponding to the incoming message and known characteristics of messages associated with the particular complaint reason identified by token vector characteristics 207. In some examples, complaint reason unit 228 may calculate a probability that the message is associated with each complaint reason of the set of complaint reasons, and determine that the message is associated with the complaint reason of the highest probability. In some examples, complaint reason unit 228 may calculate a probability that the message is associated with each complaint reason of the set of complaint reasons and determine that the message is associated with each complaint reason of greater than a threshold probability. Complaint reason unit 228 may output information indicative of the classification of the message as being associated with one or more complaint reasons of the set of complaint reasons.

Figure 3:
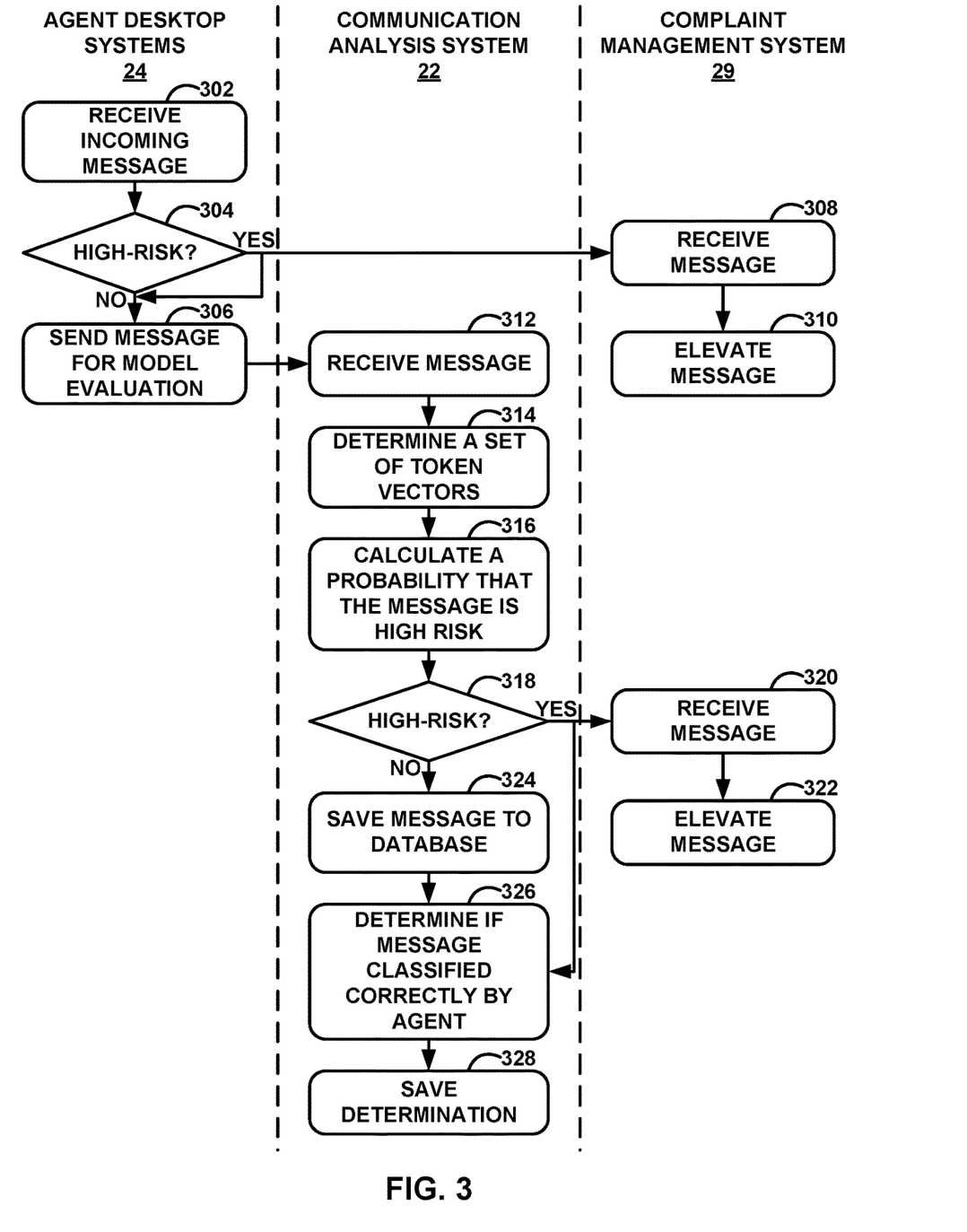
FIG. 3 is a flow diagram illustrating an example operation for classifying an incoming message to a message center, in accordance with one or more techniques of this disclosure.

FIG. 3 is a flow diagram illustrating an example operation for classifying an incoming message to message center 12, in accordance with one or more techniques of this disclosure. The example operation of FIG. 3 is described with respect to message center 12 of FIG. 1 including message routing system 20, communication analysis system 22, agent desktop systems 24, and complaint management system 29.

Agent desktop systems 24 of message center are configured to receive data indicative of an message (302) from message routing system 20. The data indicative of the message may include a string of characters. In some examples, the message may represent a user complaint from a user device of user devices 16. In some examples, the message may represent a text-based message such as a text message, an email, or a social media message. Additionally, or alternatively, the message may represent a voice message and the string of characters are generated by a voice-to-text engine configured to convert an audio message into text data. At least one of agent desktop systems 24 are configured to generate a determination of whether the message represents a high-risk message (304). If the at least one of the agent desktop systems 24 generate a determination that the message is a high-risk message ("YES" branch of block 304), agent desktop systems 24 are configured to output the message to complaint management system 28 and send the message for evaluation by a machine learning model of communication analysis system 22 (306).

Complaint management system 29 is configured to receive the message (308) and elevate the message (310) within message center 12. Elevating a high-risk message may include flagging the high-risk message as including a rather urgent, grave, or serious complaint or criticism of one or more services or aspects of the business or organization that provides message center 12. Such flagging of a high-risk message may cause complaint management system 29 to prioritize an addressing of the high-risk message so that a probability that the high-risk message is resolved is greater than a probability that high-risk messages are resolved by systems that do not flag high-risk messages. In some examples, elevating a high-risk message includes outputting, using complaint management system 29, an alert indicating that the message is flagged as high-risk. In some examples, complaint management system 29 may send one or more messages or other communications to the user device of user devices 16 which submitted the message representing the customer complaint in an attempt to resolve the customer complaint.

If the at least one of the agent desktop systems 24 generate a determination that the message is not a high-risk message ("NO" branch of block 304), agent desktop systems 24 are configured to send the message for evaluation by a machine learning model of communication analysis system 22 (306). Communication analysis system 22 may receive the data indicative of the message (312) including the sequence of characters. In some examples, the communication analysis system 22 is configured to determine a set of token vectors (314) based on the sequence of characters. For example, communication analysis system 22 is configured to determine a sequence of words based on the sequence of characters, and identify a token vector corresponding to each word of the sequence of words using a token vector database generated using training data. In some examples, communication analysis system 22 first determines a sequence of numerical tokens corresponding to each word of the set of words and identifies the set of token vectors based on the sequence of tokens. In other examples, communication analysis system 22 determines the set of token vectors based on the sequence of words without first determining the sequence of tokens.

Communication analysis system 22 is configured to calculate a probability that the message is a high-risk message (316). In some examples, to calculate the probability that the message is a high-risk message, communication analysis system 22 is configured to identify a probability that an incoming message is a high-risk message based on the identified set of token vectors. For example, communication analysis system 22 may calculate a probability that an incoming message is high-risk based on one or more characteristics of the set of token vectors corresponding to the message. Communication analysis system 22 may calculate the probability based on a level of similarity between the identified characteristics in the set of token vectors corresponding to the incoming message and known characteristics of high-risk messages that are saved in a token vector characteristics database. Communication analysis system 22 is configured to determine, based on the probability that the message is a high-risk message, whether the message is a high-risk message (318). In some examples, to determine whether the message is a high-risk message, communication analysis system 22 is configured to compare the probability with a threshold probability level. If the probability is greater than or equal to the threshold probability level, communication analysis system 22 may determine that the message represents a high-risk message. If the probability is less than the threshold probability level, communication analysis system 22 may determine that the message does not represent a high-risk message.

If communication analysis system 22 determines that the message is a high-risk message ("YES" branch of block 318), communication analysis system 22 may output the message to complaint management system 29 and determine if the message is correctly classified by agent desktop systems 24 (326). Complaint management system 29 may receive the message (320) and elevate the message (322) within message center 12. If communication analysis system 22 determines that the message is not a high-risk message ("NO" branch of block 318), communication analysis system 22 may save the message to a database (324) and determine if the message is correctly classified by agent desktop systems 24 (326). To determine if the message is classified correctly by agent desktop systems 24, communication analysis system 22 may determine a classification of the message by agent desktop systems 24 and compare the classification of the message by agent desktop systems 24 with a classification of the message by communication analysis system 22. If the classification of the message by agent desktop systems 24 is the same as the classification of the message by communication analysis system 22 (e.g., both classify as high-risk or both classify as low-risk), communication analysis system 22 may determine that the classification by agent desktop systems 24 is correct. If the classification of the message by agent desktop systems 24 is different than the classification of the message by communication analysis system 22, communication analysis system 22 may determine that the classification by agent desktop systems 24 is not correct. Communication analysis system 22 may save the determination of whether the classification of the message by agent desktop systems 24 is classified correctly to a memory of communication analysis system 22 (328). In some examples, data indicative of determinations of whether a plurality of messages are correctly classified by agent desktop systems 24 are uses in order to re-train the machine learning model used by communication analysis system 22.

Figure 4:
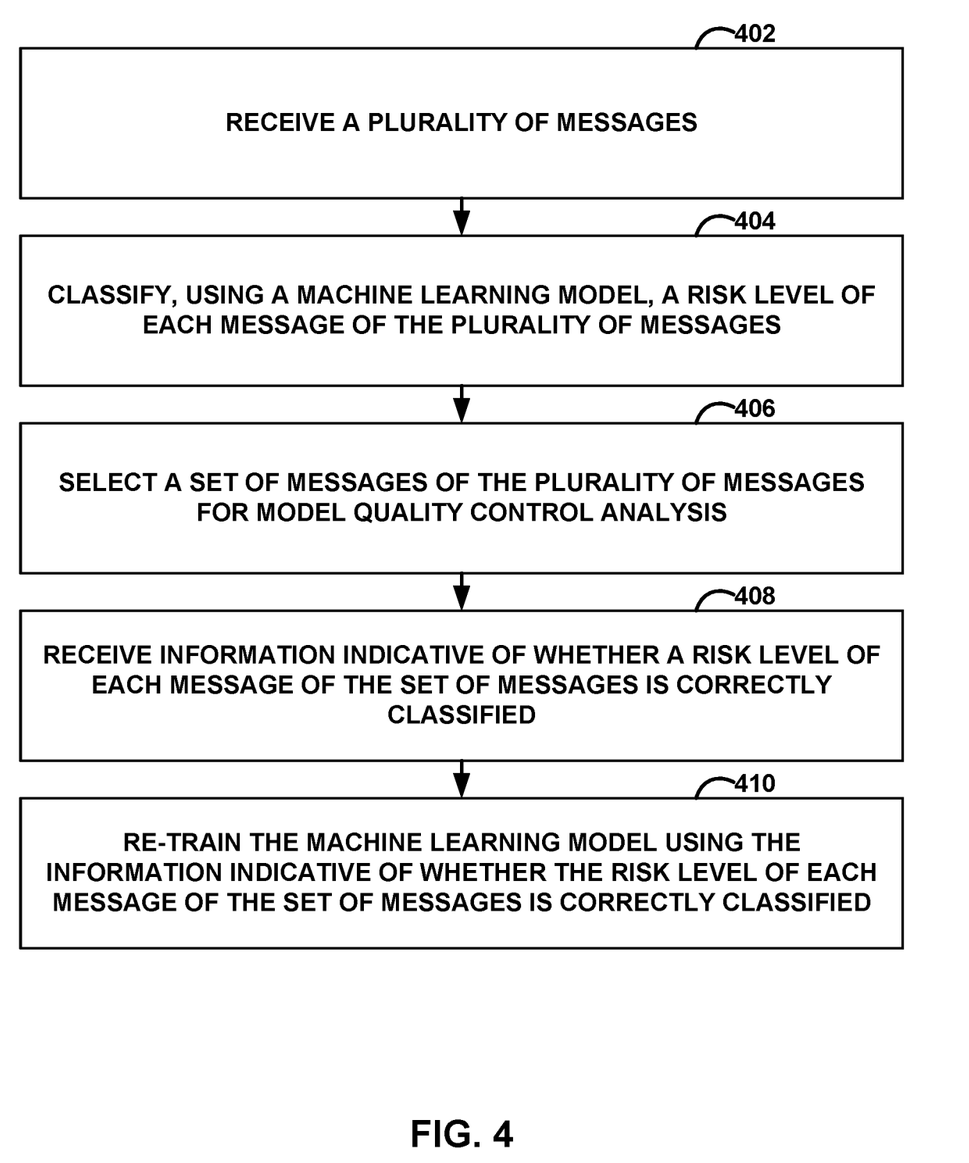
FIG. 4 is a flow diagram illustrating an example operation for performing quality control of a machine learning model executed by the communication analysis system of FIG. 1, in accordance with one or more techniques of this disclosure.

FIG. 4 is a flow diagram illustrating an example operation for performing quality control of a machine learning model executed by communication analysis system 22 of FIG. 1, in accordance with one or more techniques of this disclosure. The example operation of FIG. 4 is described with respect to message center 12 of FIG. 1 including message routing system 20, communication analysis system 22, agent desktop systems 24, and complaint management system 29.

Communication analysis system 22 may receive a plurality of messages (402) from message routing system 20. Each message of the plurality of messages may represent data including a string of characters. Communication analysis system 22 may classify, using a machine learning model (e.g., machine learning model 210 of FIG. 2), a risk level of each message of the plurality of messages (404). In some examples, to classify the risk level, communication analysis system 22 may classify each message as being either high-risk or low-risk. In some examples, communication analysis system 22 may classify each message as being high-risk, moderate-risk, or low-risk. In some examples, communication analysis system 22 may use more than three quality classifications. In any case, communication analysis system 22 may select a set of messages of the plurality of messages for model quality control analysis (406). In some examples, communication analysis system 22 may randomly select the set of messages from the plurality of messages. In some examples, communication analysis system 22 may select every nth message received by communication analysis system 22 for model quality control analysis.

Communication analysis system 22 may receive information indicative of whether a risk level of each message of the set of messages is correctly classified (408). In some examples, Communication analysis system 22 may receive the information indicative of whether the risk level of each message of the set of messages is correctly classified as user input via one or more user interfaces of communication analysis system 22. Based on the information, communication analysis system 22 may calculate one or more performance metrics associated with the machine learning model. For example, communication analysis system 22 may calculate, based on the information, a rate in which the machine learning model incorrectly identifies a message as being high-risk, a rate in which the machine learning model incorrectly identifies a message as being low-risk, a rate in which the machine learning model correctly identifies a message as being high-risk, and a rate which the machine learning model correctly identifies a message as being low-risk.

Communication analysis system 22 may re-train the machine learning model based on the information indicative of whether a risk level of each message of the set of messages is correctly classified (410). For example, training unit 230 may re-train machine learning model 210 based on a new set of training data including the training data 209 and the set of messages selected for quality control and determined to be correctly or not correctly classified using machine learning model 210. By re-training the machine learning model using quality-controlled data, communication analysis system 22 may create a machine learning model that is able to accurately identify high-risk messages at a higher rate than systems which do not re-train a machine learning model using quality-controlled data.

Figure 5:
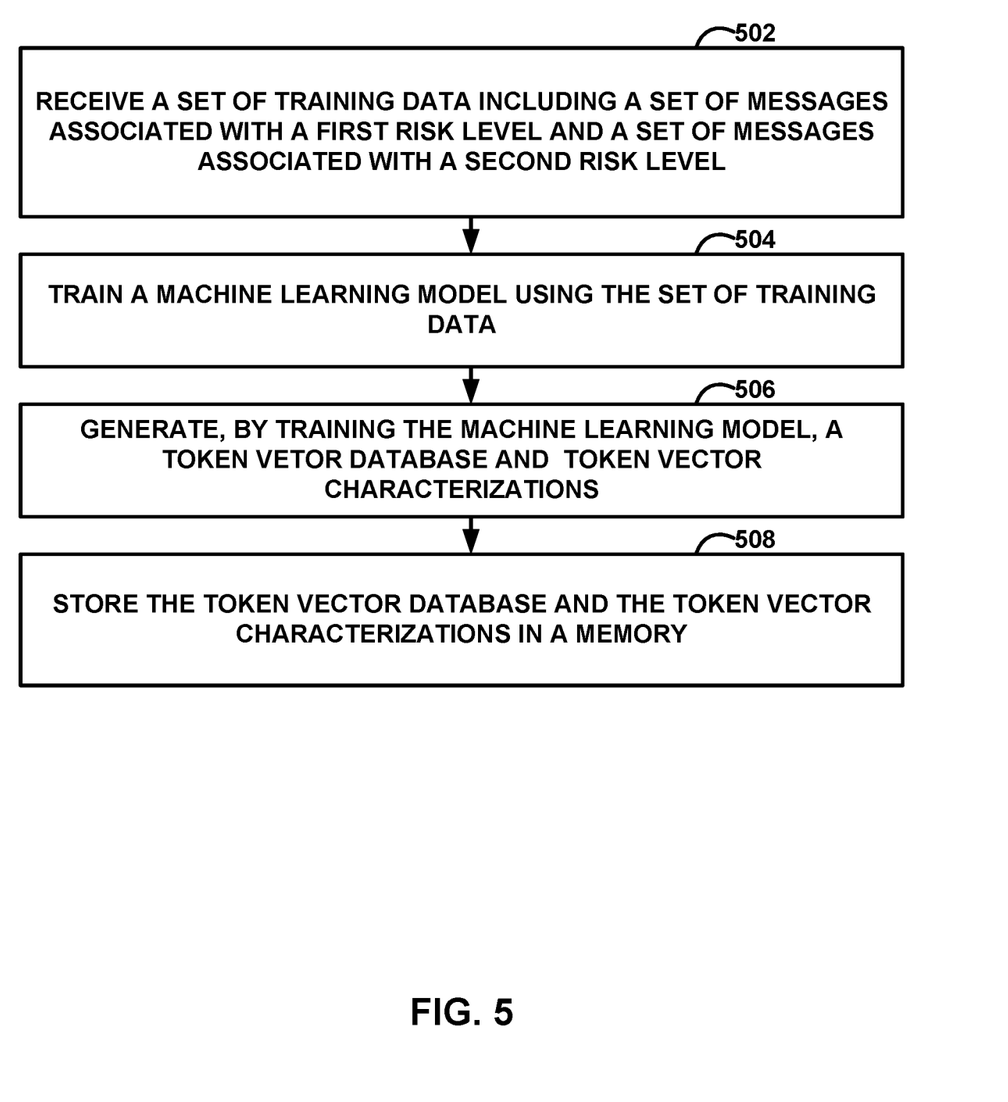
FIG. 5 is a flow diagram illustrating an example operation for training the machine learning model of FIG. 2, in accordance with one or more techniques of this disclosure

FIG. 5 is a flow diagram illustrating an example operation for training machine learning model 210 of FIG. 2, in accordance with one or more techniques of this disclosure. The example operation of FIG. 5 is described with respect to communication analysis system 200 of FIG. 2 including machine learning model 210, complaint classification unit 220, and training unit 230.

Training unit 230 may receive a set of training data 209 including data indicative of a set of messages associated with a first risk level and a set of messages associated with a second risk level (502). In some examples, the first risk level represents a high-risk level and the second risk level represents a low-risk level. In some examples, the set of messages associated with the first risk level may be approximately equal in size to the set of messages associated with the second risk level. For example, the data indicative of a set of messages associated with a first risk level may include a number of messages that is within a range from 5% lower than the number of messages in the set of messages associated with the second risk level to 5% higher than the number of messages in the set of messages associated with the second risk level.

Training unit 230 may train machine learning model 210 using training data 209 (504). By training machine learning model 210, training unit 230 may generate a token vector database 208 and token vector characterizations 207 (506). The token vector database 208 may include a plurality of token vectors, where each token vector of the plurality of token vectors corresponds to a respective word of a plurality of words. A word may include words of the English language or other languages, single numerals, groups of single numerals, numerical strings, groups of numerical strings, single characters, groups of single characters, character strings, or groups of character strings. The token vector characterizations 207 may indicate an amount that each token vector of the plurality of token vectors is associated with each characteristic of a set of characteristics. For example, the token vector characterizations 207 may indicate a level of strength (e.g., a value from 0 to 1) in which a respective token vector is associated with a high-risk characteristic. As such, using token vector characterizations 207 and token vector database 208, machine learning model may determine whether a message associated with one or more token vectors is a high-risk message. Training unit 230 may store token vector characterizations 207 and token vector database 208 in storage units 206.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
a memory; and
one or more processors in communication with the memory and configured to:
receive a set of training data including a set of messages associated with a first risk level and a set of messages associated with a second risk level, wherein the first risk level is greater than the second risk level;
train a machine learning model using the set of training data;
generate, by training the machine learning model, a plurality of token vectors;
store the plurality of token vectors in a memory as part of a token vector database;
determine, using the machine learning model and based on the plurality of token vectors, a probability that a risk level associated with a message from a user device is the first risk level;
determine, based on the probability that the risk level associated with the message is the first risk level, whether a risk classification from an agent device is correct;
based on a determination that the risk classification is correct, send the message to a complaint management system to elevate the message; and
periodically re-train the machine learning model based on an updated set of messages associated with the first risk level and an updated set of messages associated with the second risk level, wherein the updated set of messages associated with the first risk level includes one or more messages verified as being correctly classified by the machine learning model as being associated with the first risk level and wherein the updated set of messages associated with the second risk level includes one or more messages verified as being correctly classified by the machine learning model as being associated with the second risk level.

2. The computing system of claim 1, wherein the set of messages associated with the first risk level and the set of messages associated with the second risk level comprise any one or combination of voice messages, text messages, emails, and social media messages.

3. The computing system of claim 1, wherein the updated set of messages associated with the first risk level and the updated set of messages associated with the second risk level are included an updated set of training data.

4. The computing system of claim 3, wherein to periodically re-train the machine learning model, the one or more processors are configured to:
identify, in the updated set of training data, the updated set of messages associated with the first risk level; and identify, in the updated set of training data, the un updated set of messages associated with the second risk level.

5. The computing system of claim 1, wherein the one or more processors are configured to:
receive data indicative of the message from the user device, wherein the data indicative of the message comprises a string of characters;
identify, based on the string of characters, a set of token vectors from the plurality of token vectors; and
determine, using the machine learning model and based on the set of token vectors, the probability that the risk level associated with the message is the first risk level, wherein the first risk level indicates that the message is to be elevated.

6. The computing system of claim 5, wherein to identify the set of token vectors, the one or more processors are configured to:
identify, based on the string of characters, a sequence of tokens, wherein each token of the sequence of tokens corresponds to a word, phrase, or individual character of the string of characters, and wherein each token of the sequence of tokens represents a numerical value; and
determine, based on the sequence of tokens, the set of token vectors, wherein each token vector of the set of token vectors corresponds to a token of the sequence of tokens.

7. The computing system of claim 6, wherein the one or more processors are configured to:
determine the sequence of tokens for use as an input to the machine learning model; and
determine the set of token vectors as an output from the machine learning model.

8. The computing system of claim 5, wherein to determine the probability that the risk level associated with the message is the first risk level, the one or more processors are configured to:
calculate a sum of the set of token vectors; and
determine, using the machine learning model, the probability based on the sum of the set of token vectors.

9. The computing system of claim 5, wherein the message comprises a voice message including voice data, and wherein the one or more processors are configured to:
convert, using a voice-to-text engine, the voice data to the data indicative of the message which comprises the string of characters.

10. The computing system of claim 5, wherein the message represents a service complaint, and wherein the one or more processors are further configured to:
determine, using the machine learning model, a service complaint type associated with the service complaint based on the set of token vectors,
wherein the service complaint type is part of a set of service complaint types, and
wherein each service complaint type of the set of service complaint types represents a classification of a respective service complaint.

11. The computing system of claim 5, wherein the message represents a service complaint, and wherein the one or more processors are further configured to:
determine, using the machine learning model, a service complaint reason associated with the service complaint based on the set of token vectors,
wherein the service complaint reason is part of a set of service complaint reasons, and
wherein each service complaint reason of the set of service complaint reasons represents a classification of a motivation for a user to submit a respective service complaint.

12. The computing system of claim 1, wherein to send the message to the complaint management system, the one or more processors are further configured to:
determine that the message is associated with the first risk level if the probability is above a threshold value; and
in response to determining that the message is associated with the first risk level, alert the complaint management system that the message is associated with the first risk level.

13. A method comprising:
receiving, by one or more processors in communication with a memory, a set of training data including a set of messages associated with a first risk level and a set of messages associated with a second risk level, wherein the first risk level is greater than the second risk level;
training, by the one or more processors, a machine learning model using the set of training data;
generating, by training the machine learning model, a plurality of token vectors;
storing, by the one or more processors, the plurality of token vectors in a memory as part of a token vector database; and
determining, by the one or more processors using the machine learning model and based on the plurality of token vectors, a probability that a risk level associated with a message from a user device is the first risk level;
determining, by the one or more processors based on the probability that the risk level associated with the message is the first risk level, whether a risk classification from an agent device is correct;
based on a determination that the risk classification is correct, sending, by the one or more processors, the message to a complaint management system to elevate the message; and
periodically re-training, by the one or more processors, the machine learning model based on an updated set of messages associated with the first risk level and an updated set of messages associated with the second risk level, wherein the updated set of messages associated with the first risk level includes one or more messages verified as being correctly classified by the machine learning model as being associated with the first risk level and wherein the updated set of messages associated with the second risk level includes one or more messages verified as being correctly classified by the machine learning model as being associated with the second risk level.

14. The method of claim 13, wherein the updated set of messages associated with the first risk level and the updated set of messages associated with the second risk level are included in an updated set of training data.

15. The method of claim 14, wherein periodically re-training the machine learning model comprises:
identifying, in the updated set of training data, the updated set of messages associated with the first risk level; and
identifying, in the updated set of training data, the updated set of messages associated with the second risk level.

16. The method of claim 13, wherein the method further comprises:
receiving, by the one or more processors, data indicative of the message from the user device, wherein the data indicative of the message comprises a string of characters;

identifying, by the one or more processors based on the string of characters, a set of token vectors from the plurality of token vectors; and determining, by the one or more processors using the machine learning model and based on the set of token vectors, the probability that the risk level associated with the message is the first risk level, wherein the first risk level indicates that the message is to be elevated.

17. The method of claim 16, wherein determining the probability that the risk level associated with the message is the first risk level comprises:

calculating a sum of the set of token vectors; and determining, using the machine learning model, the probability based on the sum of the set of token vectors.

18. Non-transitory computer readable media comprising instructions that when executed cause one or more processors to:

receive a set of training data including a set of messages associated with a first risk level and a set of messages associated with a second risk level, wherein the first risk level is greater than the second risk level;

train a machine learning model using the set of training data;

generate, by training the machine learning model, a plurality of token vectors;

store the plurality of token vectors in a memory as part of a token vector database;

determine, using the machine learning model and based on the plurality of token vectors, a probability that a risk level associated with a message from a user device is the first risk level;

determine, based on the probability that the risk level associated with the message is the first risk level, whether a risk classification from an agent device is correct;

based on a determination that the risk classification is correct, send the message to a complaint management system to elevate the message; and periodically re-train the machine learning model based on an updated set of messages associated with the first risk level and an updated set of messages associated with the second risk level, wherein the updated set of messages associated with the first risk level includes one or more messages verified as being correctly classified by the machine learning model as being associated with the first risk level and wherein the updated set of messages associated with the second risk level includes one or more messages verified as being correctly classified by the machine learning model as being associated with the second risk level.

\* \* \* \* \*